United States Patent [19]
Rault

[11] Patent Number: 4,723,276
[45] Date of Patent: Feb. 2, 1988

[54] TWO-MODULE TELEPHONE TERMINAL
[75] Inventor: Henri-Alain A. Rault, Flers, France
[73] Assignee: U.S. Philips Corporation, New York, N.Y.
[21] Appl. No.: 785,318
[22] Filed: Oct. 7, 1985
[30] Foreign Application Priority Data
  Oct. 5, 1984 [FR] France .................. 84 15310
[51] Int. Cl.$^4$ ............................. H04M 1/02
[52] U.S. Cl. .................... 379/388; 379/419; 379/429
[58] Field of Search ............ 179/100 R, 100 D, 103, 179/100 L, 81 R, 81 A, 178, 179; 379/419, 428, 429, 433, 434, 435, 436, 388, 390

[56] References Cited
U.S. PATENT DOCUMENTS

| | | | |
|---|---|---|---|
| 3,444,329 | 5/1969 | Krumreich | 379/438 |
| 3,489,860 | 1/1970 | Greenman et al. | 379/396 |
| 3,627,930 | 12/1971 | Tolman | 379/433 X |
| 3,699,498 | 10/1972 | Hardesty et al. | 379/428 X |
| 3,745,261 | 7/1973 | Friedman | 379/394 |
| 4,303,805 | 12/1981 | Synek et al. | 379/391 |
| 4,472,602 | 9/1984 | Bordelon et al. | 379/388 |

OTHER PUBLICATIONS

"Modular Telephone User Equipment Line", H. Hansbauer et al., Telefon Report 9, 1973, Nos. 2-3, pp. 73-83.
"Siemens Miniset 200-A Compact Telephone for All Locations", H. Greska et al., Telecom Report 8, 1985, No. 6, pp. 372-376.
"Development of the New NTA Telephone Instrument", O. Gjessvå, Telektronikk (Norway), vol. 74, No. 4, 1978, pp. 306-323.

Primary Examiner—Thomas W. Brown
Assistant Examiner—R. Vaas
Attorney, Agent, or Firm—Thomas A. Briody; Jack Oisher; William J. Streeter

[57] ABSTRACT

A telephone terminal whose structure separates the high voltage and the low voltage functions in separate modules; the high voltage module being specific to the telephone network and the low-voltage module being in conformity with the service provided by the terminal.

4 Claims, 3 Drawing Figures

TWO-MODULE TELEPHONE TERMINAL

BACKGROUND OF THE INVENTION

1. Field of the Invention

The present invention has for its object to provide a telephone terminal for connection to a telephone line, of which several variants are possible, either technical variants as a function of a telephone network or functional variants in accordance with the service provided by the terminal, comprising more specifically first means for overvoltage protection, second means for accessing the line, third means for processing telephone signals.

The present invention also has for its object to provide independent modules which, in the interconnected state, constitute said telephone terminal.

2. Description of the Prior Art

Telephone terminals are well known at present; in its most simple case it is a conventional telephone set which, viewed from the exterior, comprises a base and a hand-set; the hand-set only comprises a microphone and a loudspeaker connected to the base via a four-wire cord for transmitting audio signals; the base contains all the circuitry necessary for operation of the set; to satisfy the protection standards, which protect both set and the user, some of the circuits are short-circuit proof and/or protected from accidental high voltages coming from the line; other circuits are designed for operating only on low-voltage, which requires a different technology.

Besides the conventional telephone set, the miniaturisation brought about by the contemporary state of the electronic art has made it possible to realise these last few years one-module telephone sets; such a single unit resembles to a certain extent a conventional hand-set but it additionally comprises dialling means and a line interrupter, these two last-mentioned elements replacing the well-known dial and the cradle in the base of the conventional set; thus, the one-module telephone set comprises all the necessary circuitry and can function without a base with a simple cord having a connector for connecting to a wall socket.

In view of the fast evolution of modern techniques, which has more specifically enabled the realisation of one-module sets, these known structures are not without drawbacks.

In one-module or two-module telephone sets it is necessary, as mentioned above, when one wants to change the network to which it is connected, or to change the service it provides, to modify all the sets in both these cases.

SUMMARY OF THE INVENTION

According to the present invention, a telephone terminal is characterized in that its structure comprises a first module which is more particularly constituted by said overvoltage protection means and said line accessing circuit means, and a second module constituted more particularly by said signal processing circuit means, such that the structure of the first module is the same for a particular kind of network whatever the service provided by the terminal, and the structure of the second module is the same for a particular kind of service supplied by the terminal whatever the telephone network.

Put differently, the first module comprises, for example, all the protection means required for the particular network—that is to say generally the protections required by the relevant state regulations—so that no additional protection whatever is necessary in the second module which comprises only low-voltage circuit means—that is to say, for example, circuit means in accordance with the recommendations of the CCITT.

As the recommendations of the CCITT are respected by the majority of European countries—and even by the whole world—the great advantages of the invention both for the manufacturer and the customer will be apparent.

For the manufacturer the invention provides very high production advantages—larger quantities—and larger production runs.

For the user—for example the administration of the PTT in France—the invention provides very significant savings in stock size, as it will be much easier to remove an old-fashioned module and to install the single substituting module instead of a complete terminal, whilst preserving the same quality of service to the user.

To benefit fully from the interior, it is particularly advantageous for the two modules to be connected by means of connection means having at least one plug-in end.

Advantageously, the connection means comprise more specifically:

a first connection for transmitting a common reference voltage signal, a second connection for transmitting a supply voltage originating from the first module to the second module, a third connection for transmitting to the first module loop-opening dialling signals coming from the second module, a fourth connection for transmitting an automatic gain control signal from the first module to the second module.

BRIEF DESCRIPTION OF THE DRAWING

Further advantages will become more apparent and a preferred but non-limitative embodiment will be better understood from the following description with reference to the accompanying two Figures.

Figure 1:
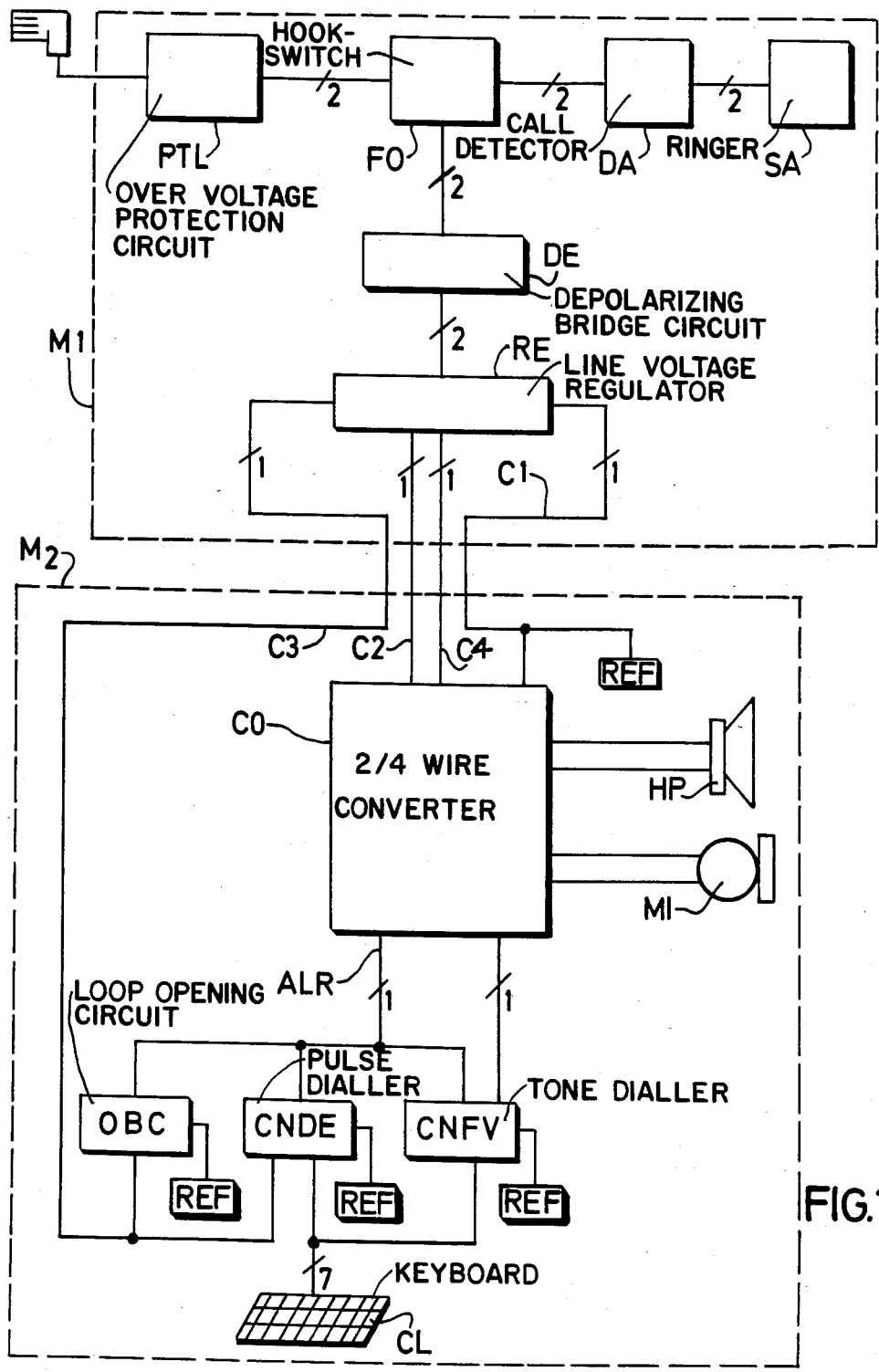
FIG. 1 shows a telephone station.

The telephone station in FIG. 1 is of a type used in France, but the invention is not limited to such a telephone station. For a different country and a telephone station of a different service the structure of the invention will nevertheless be the same.

In the first module (M1) head-end overvoltage protection means (PTL), hook-switch means (FO), call detection (DA) and call signalling (SA) means are shown; the call signalling means may be a bell, a light signal etc; the connecting lines are all symbolically represented by the sign "/n" where "n" represents the number of wires generally used.

When a call is detected, and the hand-set has been lifted from the hook-switch—example: the user accesses the line by lifting the hand-set resting on the hook-switch—, the line signals are transmitted to the depolarising bridge circuit (DE) and to the regulating means (RE).

All the above-mentioned means in the first module (M1) are realised in high-voltage circuits as a function of the specifications of the particular telephone network; in France the PTT stipulates that the telephone network must be lightning-resistant, and proof against short-circuiting with a line of the EDF, etc . . . ; in other countries the specifications may be different, which will require variants of the first module.

In contradistinction therewith, in a given country the first module will remain unchanged as long as the specifications of the network remain unchanged.

In the second module (M2) there are shown a conventional 2 wire/4 wire converter (CO) connected to a loudspeaker (H.P.) and a microphone (MI); the converter (CO) transmits a controlled supply voltage (ALR) to the dialling circuits; in accordance with the recommendations of the CCITT, the dialling system is in the process of evolving from pulse dialling to speech-frequency tone dialling; for that reason the two dialling circuits are shown, but in practice only one circuit will be present, since a telephone exchange can only be operating, at a given moment, on either a pulse basis or a speech-frequency tone basis; in all these cases there are dialling means, here a keyboard (CL) which controls either the pulse circuit (CNDE) or the speech-frequency tone circuit (CNFV).

Whatever the dialling circuit provided in the module M2, the same d.c. supply circuit may be used because the connections to the dialling circuit do not alter the functioning of the module. The signal processing circuit in the second module can therefore be comprised in a single printed circuit board.

The dialling circuits, by way of a calibrated loop-opening circuit (OBC), transmit loop-opening dialling signals to the first module via the connection (C3).

The regulating means (RE) for controlling the first module (M1) are connected to the converter (CO) of the second module (M2); a first connection (C1) transmits a reference signal (REF) which is used in common by all the circuits; a second connection (C2) transmits a supply voltage coming from the telephone line; a third connection (C4) transmits automatic gain control signals for regulating the amplification produced in microphone M1 and speaker HP.

This description is not intended to explain the operation of a telephone station, which is well known to a person skilled in the art, but it describes the structures of the first module (M1) and the second module (M2) which, in the non-limitative case of a telephone station, are connected via four connections (C1, C2, C3, C4) described above.

For other types of telephone terminals the same structure is obviously advantageous; for example, the second module of a telephone station becomes capable of being plugged into a Minitel terminal which, according to the invention, comprises a first module which therefore need not be duplicated in the module in the user's device; similarly, a telephone answering device becomes capable of being plugged into a telephone station which already comprises the first module, which simplifies the answering device since the first module is no longer required therein; the same plug-in answering devices can be used in any country since the second module in the answering device does not depend on the telephone network.

Figure 2A:
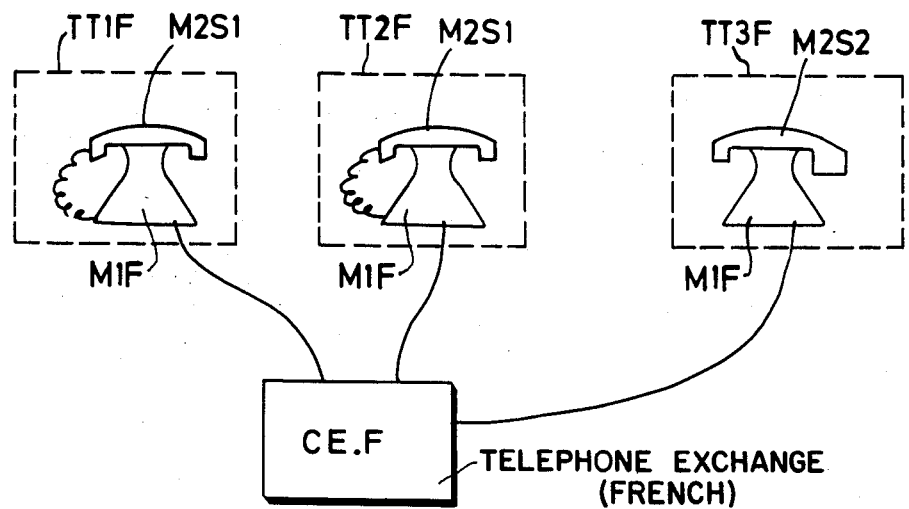
FIG. 2a shows a network as used in France.
Figure 2B:
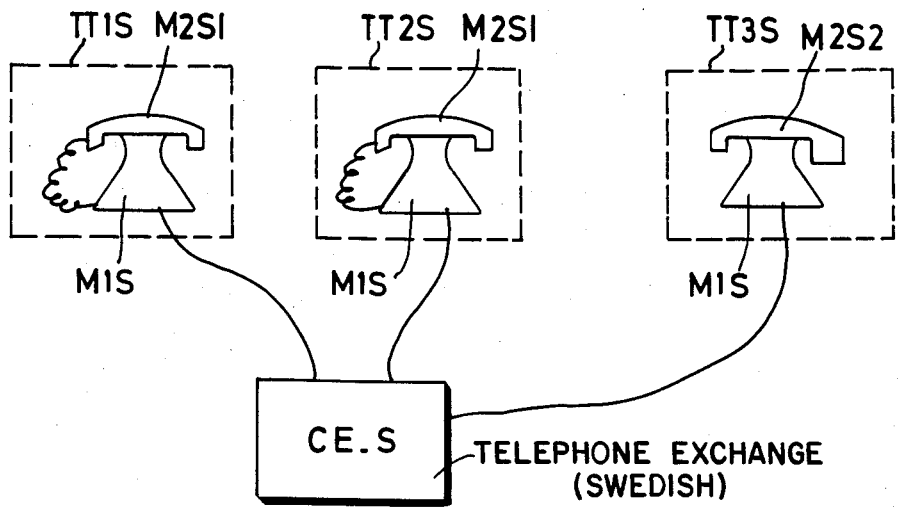
FIG. 2b shows a network as used in Sweden.

This interchangeability, or portability, of the modules provided by the structure according to the invention is illustrated in FIG. 2, where an array of telephone terminals (TTii) are connected in FIG. 2a to a French telephone exchange (CE.F) and in FIG. 2b to a, for example, Swedish telephone exchange (CE.S).

Each terminal (TTii) comprises two modules according to the invention; in the French network, all the first modules (M1F) of each terminal (TT1F, TT2F, TT3F) are the same; in the Swedish network, all the first modules (M1S) of each terminal (TT1S, TT2S, TT3S) are the same; for terminals which provide the same service (S1) the two modules (M2S1) of the terminals TT1F, TT2F, TT1S and TT2S are identical; for another kind of identical service (S2) the second modules (M2S2) of the terminals TT3F and TT3S are the same.

The description given in the foregoing show quite clearly that all the components of the second modules are low-voltage components, whereas the components of first modules comprise all of the necessary protection against overvoltages specified for the particular telephone network.

What is claimed is:

1. In a telephone station for providing a specified kind of telephone service and adapted to be connected by a telephone line to a telephone network, such telephone station comprising a base, a handset connected to the base by plug-in interconnecting means, line overvoltage protection circuit means, line accessing circuit means, and signal processing circuit means having an output at which it produces dialling signals corresponding to the specified kind of telephone service, the improvement characterized in that:

said overvoltage protection circuit means and line accessing circuit means are comprised in a first module included in said base, the electrical characteristics of such first module being determined by the electrical characteristics of said telephone network but being independent of the specified kind of telephone service to be provided; and said signal processing circuit means are comprised in a second module included in said handset, the electrical characteristics of such second module being determined by the specified kind of telephone service to be provided but being independent of the electrical characteristics of said telephone network; and a hybrid coupling comprised in said second module and connected to said signal processing circuit means therein, said hybrid coupling and the output of said signal processing circuit means being connected by said plug-in interconnecting means to said line accessing circuit means in said first module;

whereby the overvoltage protection and line accessing circuit means in said first module are physically and electrically separate and distinct from the hybrid coupling and signal processing circuit means in said second module except for the interconnection between said modules provided by said plug-in interconnecting means.

2. A telephone station as claimed in claim 1, wherein said line accessing circuit means comprises call detecting means, call indicating means connected thereto, a hook-switch which couples the call detecting means to the overvoltage protection means, and line voltage regulating means for stabilizing the telephone line voltage; said hybrid coupling is a 2/4 wire converter; and said signal processing circuit means in said second module comprises a loudspeaker, a microphone and a dialling circuit all of which are coupled by said converter to said line voltage regulating means in said first module.

3. A telephone station in accordance with claim 1, wherein the signal processing circuit means in said second module is comprised in a single printed circuit board.

4. A telephone station in accordance with claim 1, wherein said hybrid coupling is a 2/4 wire converter circuit and said plug-in connecting means comprises:
  a first connection for transmitting a common reference voltage signal from said first module to said second module;
  a second connection for transmitting a supply voltage from said first module to said second module;
  a third connection for transmitting to the first module dialling signals originating from the output of said signal processing circuit means in said second module; and
  a fourth connection for transmitting automatic gain control signals from said first module to said signal processing circuit means in said second module.

* * * * *